(12) United States Patent
McCarthy et al.

(10) Patent No.: US 11,978,918 B2
(45) Date of Patent: May 7, 2024

(54) MODULAR INSTALLATION OF ENERGY STORAGE SYSTEM

(71) Applicant: Lunar Energy, Inc., Mountain View, CA (US)

(72) Inventors: Christopher McCarthy, Salinas, CA (US); Tahina Christine Felisca, Redwood City, CA (US); Peter H. J. How, Mililani, HI (US); Scott A. Whitman, San Francisco, CA (US); Eamon Briggs, Soquel, CA (US); Sanchita Sheth, San Jose, CA (US); Tanner Bruce DeVoe, Fremont, CA (US); Mark Daniel Goldman, Los Altos Hills, CA (US); Kevin Richard Fine, Redwood City, CA (US)

(73) Assignee: Lunar Energy, Inc., Mountain View, CA (US)

( * ) Notice: Subject to any disclaimer, the term of this patent is extended or adjusted under 35 U.S.C. 154(b) by 0 days.

(21) Appl. No.: 17/952,923

(22) Filed: Sep. 26, 2022

(65) Prior Publication Data

US 2024/0106050 A1    Mar. 28, 2024

(51) Int. Cl.
*H01M 50/244* (2021.01)
*H01M 10/42* (2006.01)
*H01M 50/251* (2021.01)
*H01M 50/258* (2021.01)
*H01M 50/271* (2021.01)

(52) U.S. Cl.
CPC ....... *H01M 50/244* (2021.01); *H01M 10/425* (2013.01); *H01M 50/258* (2021.01); *H01M 50/271* (2021.01); *H01M 50/251* (2021.01); *H01M 2220/10* (2013.01)

(58) Field of Classification Search
CPC ................................. H05K 7/18; H05K 7/143
USPC ........................................ 248/220.21, 217.1
See application file for complete search history.

(56) References Cited

PUBLICATIONS

Generac Installation and Owner's Manual Generac PWR cell Battery 2021 (Year: 2021).*
Generac Installation and Owner's Manual Generac PWRcell Inverters XVT076A03, XVT114G03 (Year: 2021).*

* cited by examiner

*Primary Examiner* — Maria Laios
(74) *Attorney, Agent, or Firm* — Van Pelt, Yi & James LLP

(57) ABSTRACT

In various embodiments, an energy storage mounting system includes an inverter wall bracket mounted to a wall, wherein an inverter is coupled to the inverter wall bracket. The system includes a battery wall bracket to which a battery block is coupled. The battery wall bracket interfaces with an auxiliary bracket that is mounted to the wall, is vertically translatable relative to the auxiliary bracket, and is at least in part ground-supported. The battery block is electrically connected to the inverter.

22 Claims, 10 Drawing Sheets

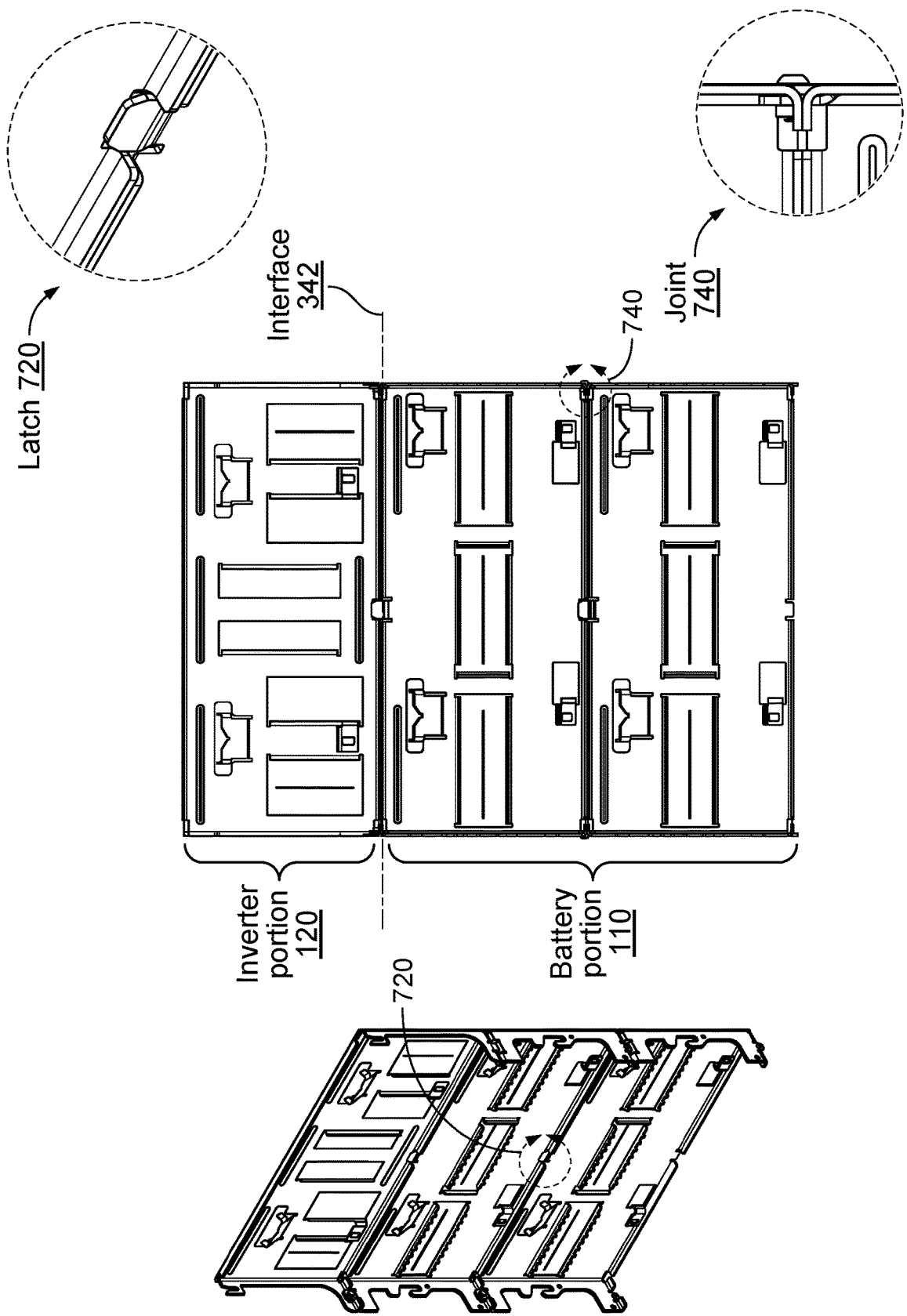

MODULAR INSTALLATION OF ENERGY STORAGE SYSTEM

BACKGROUND OF THE INVENTION

Energy storage systems are often installed in areas subject to ground settling where the ground and wall move relative to each other. Ground settling (or more generally, changes to the surface upon which an energy storage system is installed) may cause problems such as damage to the wall or premature failure of various components of the energy storage system. For example, components not intended to bear weight may be subject to increased weight or electrical conduits are moved due to the ground settling. Thus, there is a need for improved installation of energy storage systems.

BRIEF DESCRIPTION OF THE DRAWINGS

Various embodiments of the invention are disclosed in the following detailed description and the accompanying drawings.

FIG. 7 shows coupled battery wall brackets according to an embodiment of the present disclosure.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Modular installation of an energy storage system is disclosed. Techniques of the present disclosure provide an installation that accommodates ground settling including upward or downward movement of the ground relative to the wall. In various embodiments, within the same enclosure, an inverter is wall-supported while one or more batteries are ground-supported. The inverter remains substantially stationary, while the batteries tolerate movement. The portion of the system coupled to electrical conduits remains substantially stationary relative to the conduits (or moves within a range that accommodates the stretchiness of the conduits), while the remainder of the system is able to move down with ground settling. The installation is modular and can support one or more batteries. In various embodiments, three to six battery packs may be installed. As further described herein, substantially all of the mechanical support is provided by one or more auxiliary brackets and feet.

Figure 1:
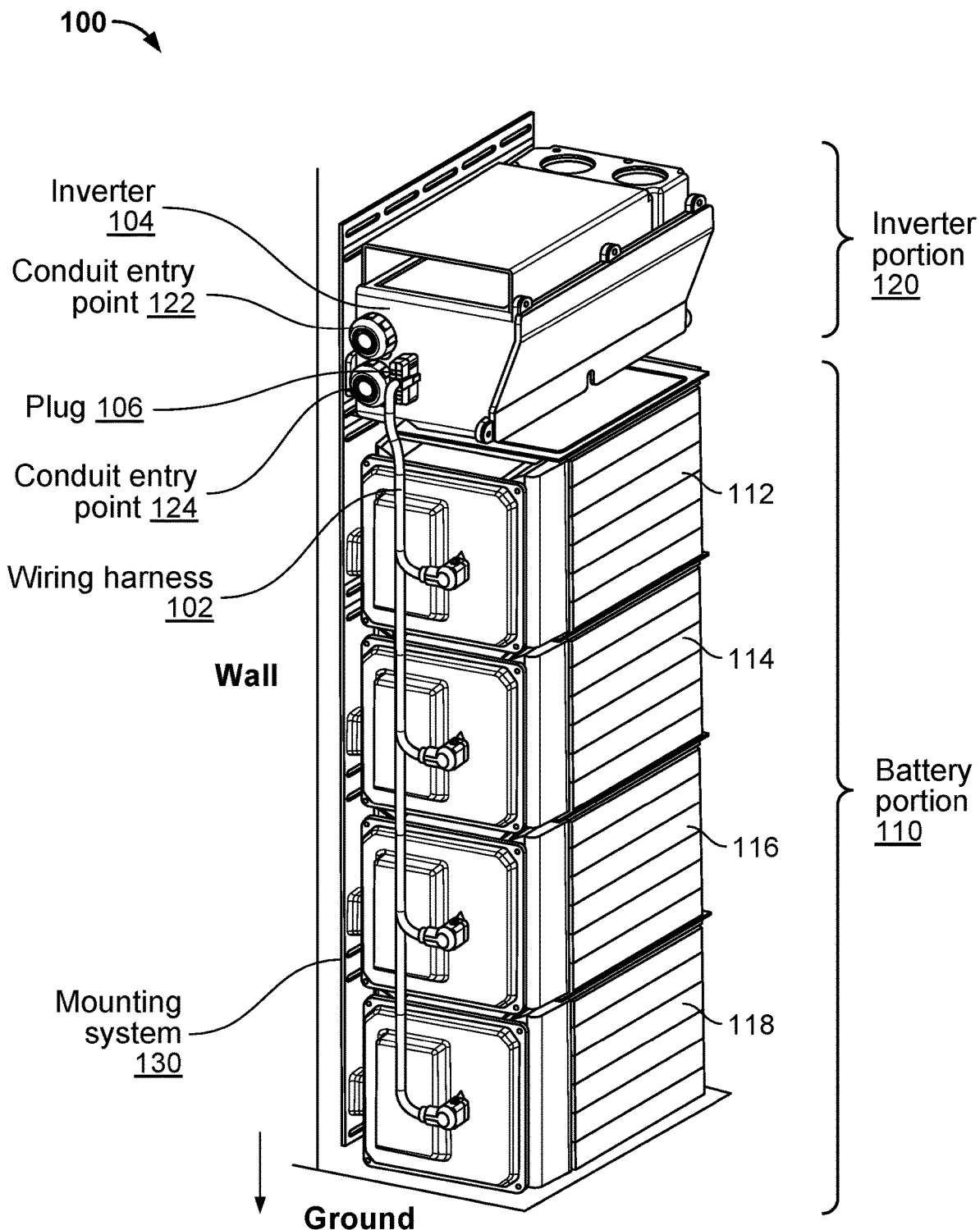
FIG. 1 is a perspective view of an energy storage system according to an embodiment of the present disclosure.

First, an example energy storage system is described (FIG. 1). This energy storage system is merely exemplary and not intended to be limiting as the disclosed installation techniques may be applied to other types of energy storage systems. Next, example mounting hardware including wall brackets and foot brackets are described (FIGS. 2-9). Finally, an example installation process is described (FIG. 10).

FIG. 1 is a perspective view of an energy storage system according to an embodiment of the present disclosure. The energy storage system (sometimes called "a power system") includes an inverter 104 and one or more battery blocks 112-118 (sometimes called "batteries" for simplicity).

The battery block(s) 112-118 store energy, which may come from various sources such as solar panels, the grid, etc. The battery block(s) are at least in part ground-supported. In various embodiments, one or more battery blocks 112-118 are stacked on top of each other. While an example battery system with four battery blocks is shown for illustrative purposes, the modular and scalable battery system may be configured to have any number of battery blocks, as appropriate. In this example, the system is a 20 kWh system with four battery blocks (where each battery block is a 5 kWh subsystem).

In various embodiments, each battery block has a DC-DC converter, which all feed into the central inverter 104. That is, the battery block(s) are electrically connected to the inverter. The inverter is responsible for converting between various power sources (such as the battery block(s), solar panels, and the grid), and trading between them as needed by the power system. The inverter 104 has one or more conduit entry points 122 and 124. A conduit may couple the inverter to the various power sources.

A wiring harness is shown at 102. In this example, the wiring harness has five connectors on it; one for each of the four battery blocks, and one connector that plugs into the inverter 104 via plug 106. In some embodiments, the battery blocks are individually connected to the inverter, without daisy chaining or serialization.

The energy storage system 100 can be installed by resting the system on the ground and securing the system to the wall (e.g., via a single stud) to prevent the system from tipping forward. The majority of the weight is supported by the ground and the attachment to the wall is to prevent the system from tipping over. The weight of the energy storage system may range from 350 pounds to over 600 pounds. Ground settling often occurs due to foundation settling or other causes that move the ground and wall relative to each other. The wall and ground are shown in the figure and the arrow shows the typical direction of movement of the ground due to ground settling. The disclosed techniques accommodate movement in the direction of the arrow or opposite the arrow. The degree of movement can range up to 1 cm or in the range of from around 5 mm to over 1 cm. If the energy storage system is hard mounted to the wall, then as the ground settles, the weight may shift to being supported by the wall instead of the ground. This is undesirable because this may damage the wall or the way in which the system is attached to the wall. In certain configurations, where the majority of the weight of the system is supported by the ground, the mounting components are typically not designed to support the majority of the weight via the wall, so if ground settling causes the weight to shift, then the mounting components may fail. In addition, any electrical conduits mounted to the wall could be dragged and moved due to ground settling, putting strain on the conduits and shortening their lifespan.

In various embodiments, the disclosed techniques allow the battery portion 110 (which makes up most of the weight of the system) to remain mounted and supported by the ground and shift down (due to ground settling), while the inverter portion 120 remains substantially stationary.

Here, the energy storage system is depicted with a mounting system (specifically, five wall brackets, one for the inverter and one for each battery block) and without an aesthetic cover/shield or foot bracket. Examples of the mounting system 130 are shown in the following figures.

Figure 2:
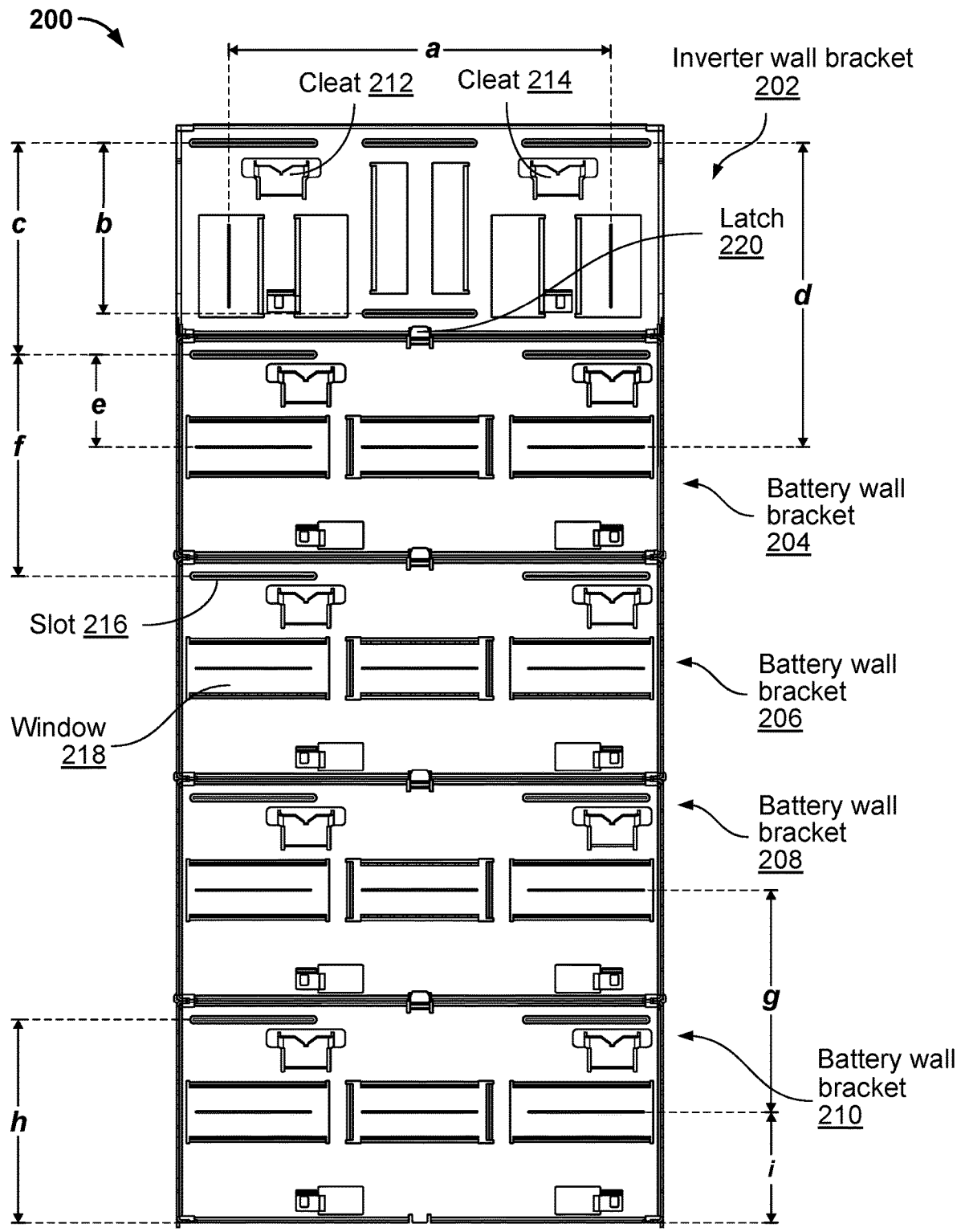
FIG. 2 is a front view of an energy storage mounting system according to an embodiment of the present disclosure.

FIG. 2 is a front view of an energy storage mounting system according to an embodiment of the present disclosure. The energy storage mounting system 200 (sometimes simply called the system) includes inverter wall bracket 202 and one or more battery wall brackets 204-210. In this example, there are four battery wall brackets, 204, 206, 208, and 210. The number of battery wall brackets is merely exemplary and not intended to be limiting. This mounting system is an example of mounting system 130 of FIG. 1.

Each of the wall brackets has one or more mounting slots 216 (sometimes simply called "slots"). For simplicity, only one of the slots 216 is labeled. In this example, each of the battery wall brackets 204-210 has two slots, one on the left side above the left cleat and one on the right side above the right cleat. The inverter wall bracket 202 has three slots as shown. The number and placement of slots is merely exemplary and not intended to be limiting. A screw or other fastening device can be driven through the slot, into a stud on the wall for example, to install the wall bracket to the wall.

The inverter wall bracket 202 is adapted to be mounted to a wall. As further described herein, the inverter wall bracket can receive an inverter. In other words, an inverter is coupled to the inverter wall bracket. The inverter wall bracket can be decoupled from one or more battery wall brackets such that the battery wall bracket(s) are translatable relative to the inverter wall bracket. In various embodiments, the inverter wall bracket is fixed stationarily to the wall. FIGS. 2-5 show examples of an inverter wall bracket.

Figure 8B:
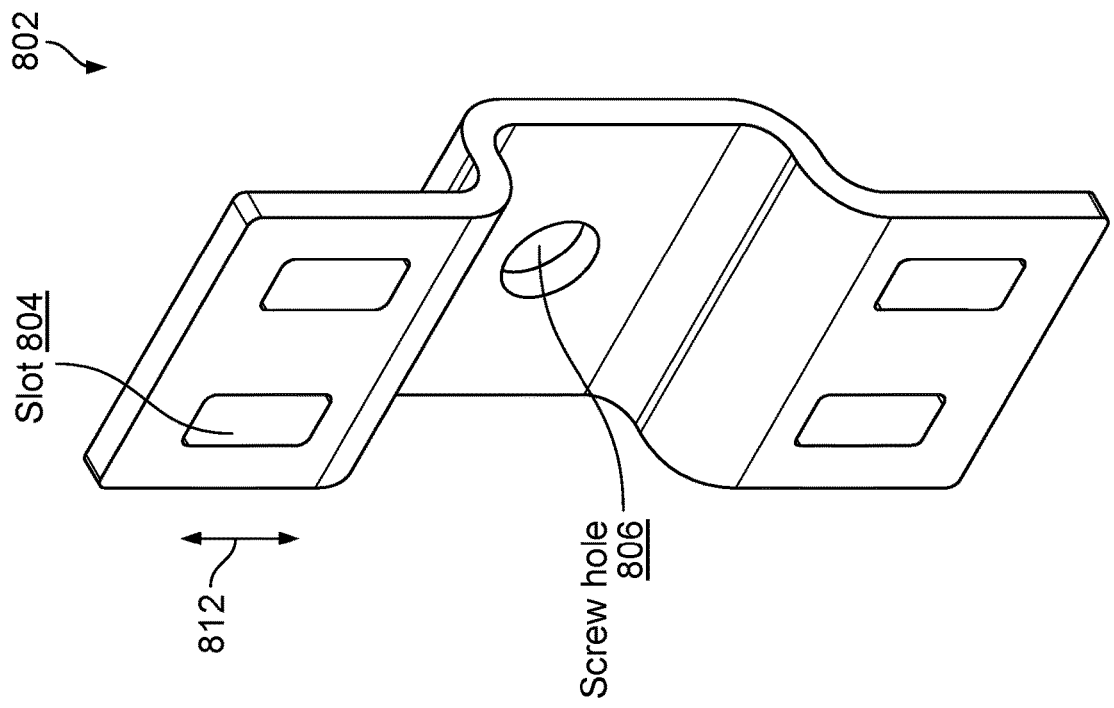
FIG. 8B is a perspective view of an auxiliary bracket according to an embodiment of the present disclosure.
Figure 8A:
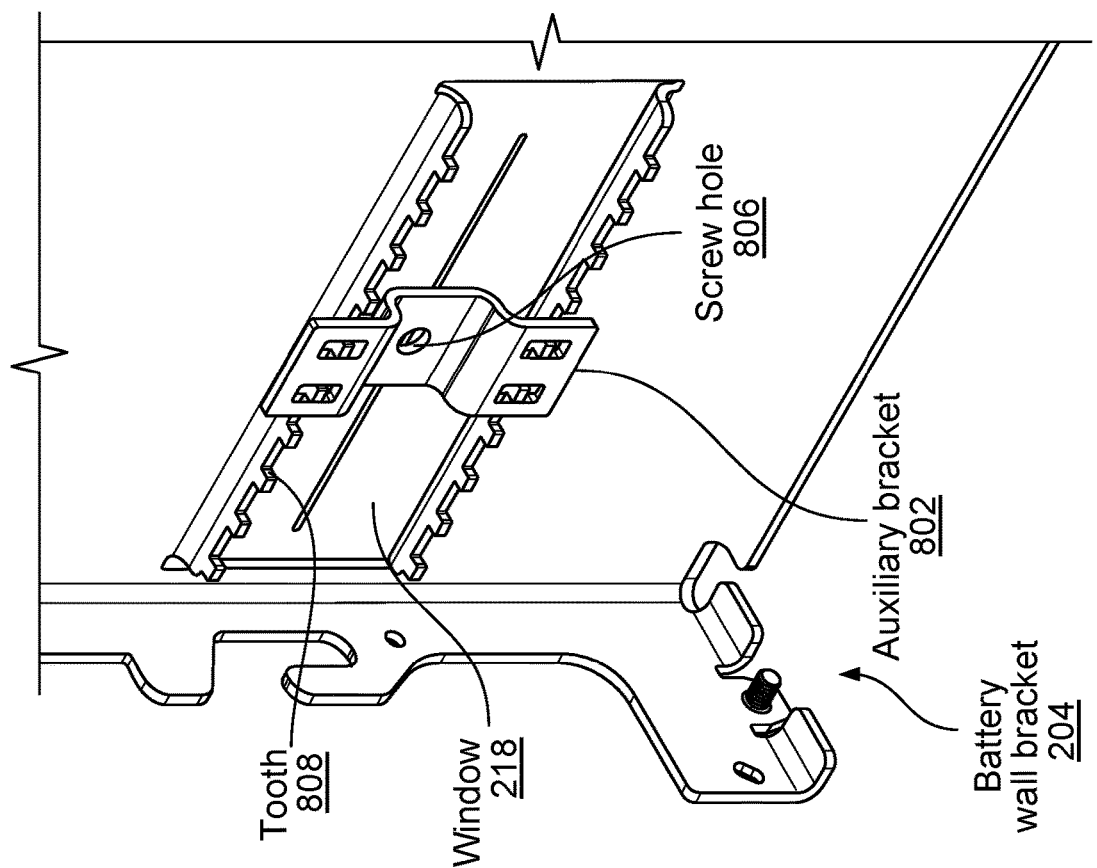
FIG. 8A is a perspective view of an auxiliary bracket interfacing with a battery wall bracket according to an embodiment of the present disclosure.

Each of the battery wall brackets 204-210 is adapted to receive a battery block. In other words, a battery block is coupled to a battery wall bracket. As further described herein, the battery wall bracket interfaces with an auxiliary bracket that is mounted to the wall. The battery wall bracket is vertically translatable relative to the auxiliary bracket. FIGS. 8A-8B show an example of an auxiliary bracket. FIGS. 2-4, 6, and 7 show examples of battery wall brackets.

Some example measurements corresponding to those shown in FIG. 2 are:
a=467 mm
b=208.5 mm
c=259 mm
d=371.5 mm
e=112.5 mm
f=271 mm
g=272 mm
h=248 mm
i=135.5 mm The measurements are merely exemplary and not intended to be limiting as other measurements are possible.

Each of the wall brackets (202-210) has one or more cleats 212 and 214 adapted to receive the inverter (in the case of inverter wall bracket 202) or battery blocks (in the case of battery wall brackets 204-210). In various embodiments, the mounting system is a French-cleat style or hook and cleat style mounting system. For example, each battery block has a frame that runs along the fronts and backs of the battery modules in the battery block. The frames have hooks, allowing the battery block to be mounted to the wall by hanging or hooking the hooks of the frames of the battery block onto the cleat of the battery wall bracket. The hooks are portions of the frames that support the battery modules when hung on the wall.

As further described herein, during installation, the battery blocks and inverter can be attached to the respective wall brackets using the cleats. When a battery block is installed, the frames are supported by the hooks and the wall cleat. The frames in turn hold up the stack of battery modules in the battery block. That is, the frames provide a mechanical base structure. Hooks are but one example of a geometry usable to attach the battery block. A wall bracket is but one example of a compatible wall-mounted component.

Each of the battery wall brackets (204-210) has one or more windows 218. For simplicity, only one of the windows 218 is labeled. In this example, each of the battery wall brackets 204-210 has three windows. The number and placement of windows is merely exemplary and not intended to be limiting. Each window is adapted to receive an auxiliary bracket. The number of windows provided or used can be adapted to the expected installation location or characteristics of the energy storage system. The window is sized so that two are used or a single one is used. For example, a heavier system is more securely installed by using the two outer windows. That is, coupling the battery wall bracket to the wall is via two wall studs and driving a fastener through the two outer windows. Alternatively, a system can be installed by using a single, center stud, which is driven through a middle window. As further described herein, the window and auxiliary bracket coupling enables the battery wall brackets to vertically translate (move up and down) relative to the wall (within some degree of tolerance) so that the batteries are allowed to move to some degree due to ground settling.

Each of the wall brackets is coupled to another wall bracket by a latch 220 and a joint on the left side and right side (further described in the following figures).

Figure 3:
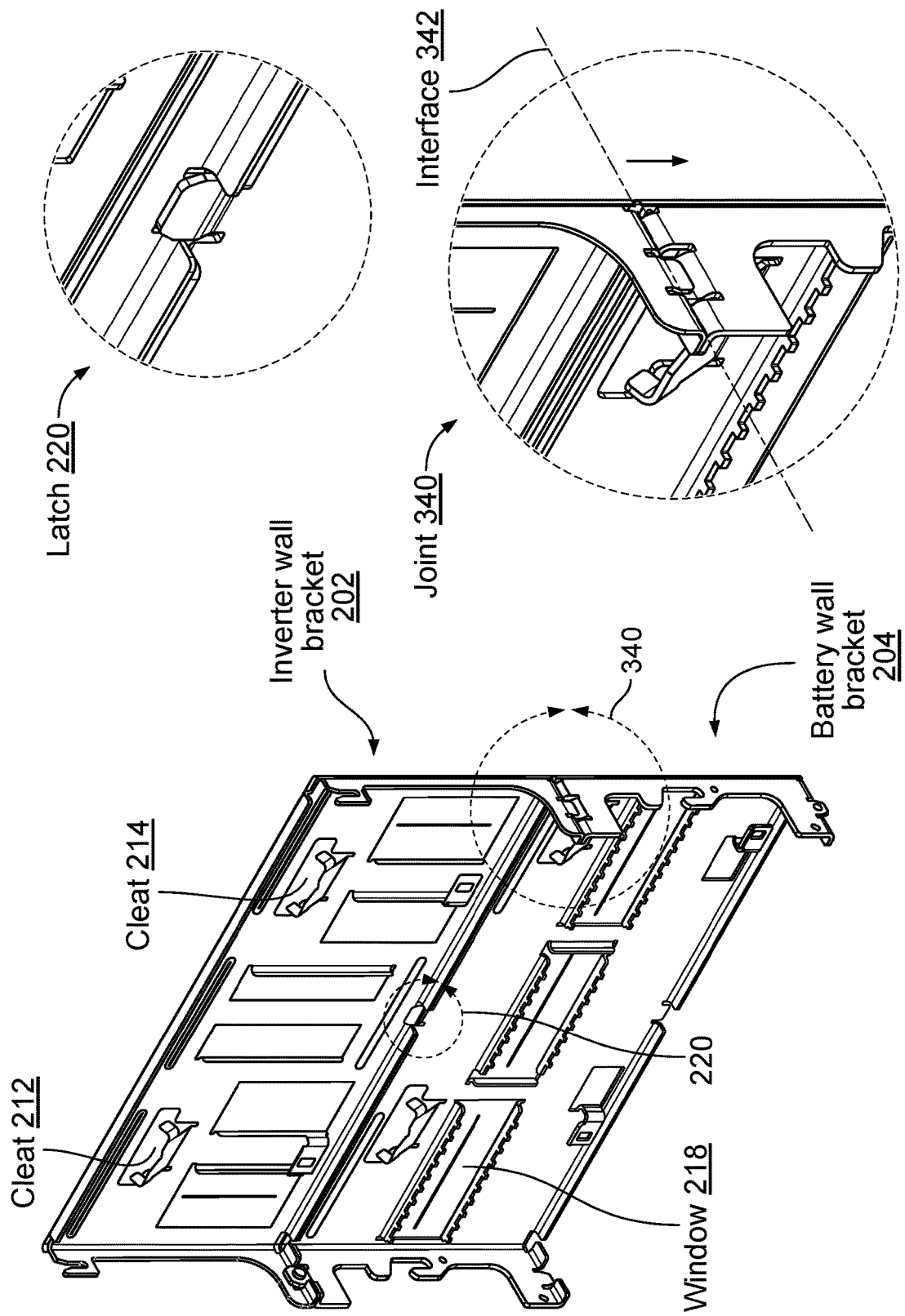
FIG. 3 is a perspective view of an inverter wall bracket coupled to a battery wall bracket according to an embodiment of the present disclosure.

FIG. 3 is a perspective view of an inverter wall bracket coupled to a battery wall bracket according to an embodiment of the present disclosure. Each of the components are like their counterparts in FIG. 2 unless otherwise described.

The inverter wall bracket 202 is joined to the rest of the energy storage mounting system by a joint pictured in inset 340. Unlike the joints that join battery wall brackets to each other, which have screws (further described with respect to FIG. 4), joint 340 does not have a screw.

In the event of ground settling, an interface 342 opens due to movement of the battery wall bracket in the direction arrow. The interface 342 extends across the width of the energy storage mounting system. A gap at the interface 342 forms between the inverter wall bracket 202 (which remains fixed to the wall) and the battery wall brackets (which are substantially supported by the ground and move with ground settling).

Figure 4:
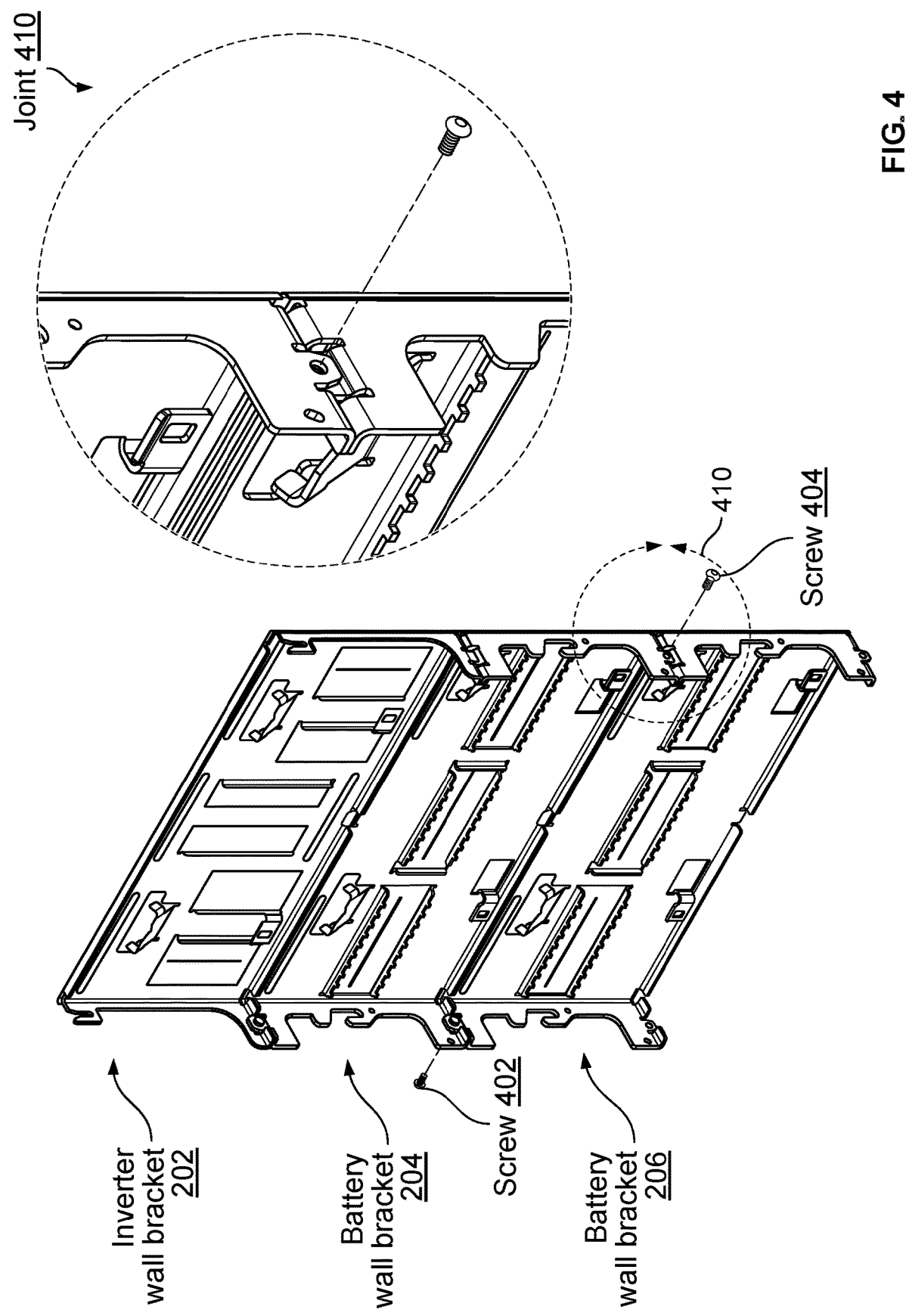
FIG. 4 is a perspective view of an inverter wall bracket coupled to two battery wall brackets according to an embodiment of the present disclosure.

Although not shown, a cover that covers the entire energy storage system also has space between the inverter portion 120 and the battery portion 110 so that as the two portions separate, the cover moves down relative to the inverter portion. That is, the cover moves relative to the inverter portion (inverter wall bracket) in response to vertical translation of the battery wall bracket. The assembly remains fully enclosed and the cover is non-interfering FIG. 4 is a perspective view of an inverter wall bracket coupled to two battery wall brackets according to an embodiment of the present disclosure. This figure shows details of a joint for coupling battery wall bracket 204 to battery wall bracket 206. Each of the components are like their counterparts in FIG. 2 unless otherwise described.

In this example, the two battery wall brackets are fastened together at a joint pictured in inset 410 with screws 402 and 404. As described herein, the energy storage system is modular, so additional battery wall brackets can be joined to the mounting system in the manner described to provide as many battery wall brackets as needed to support battery blocks. The battery wall brackets are screwed (or more generally, fastened) together to form a monolith. The monolith moves together so that when there is ground settling, a gap forms between the inverter wall bracket 202 and the group of battery wall brackets (here, 204 and 206), but no gap between each individual battery wall bracket. The inverter wall bracket 202 remains fixed to the wall, while battery wall brackets 204 and 206, which are substantially supported by the ground, move together down due to ground settling.

Figure 5:
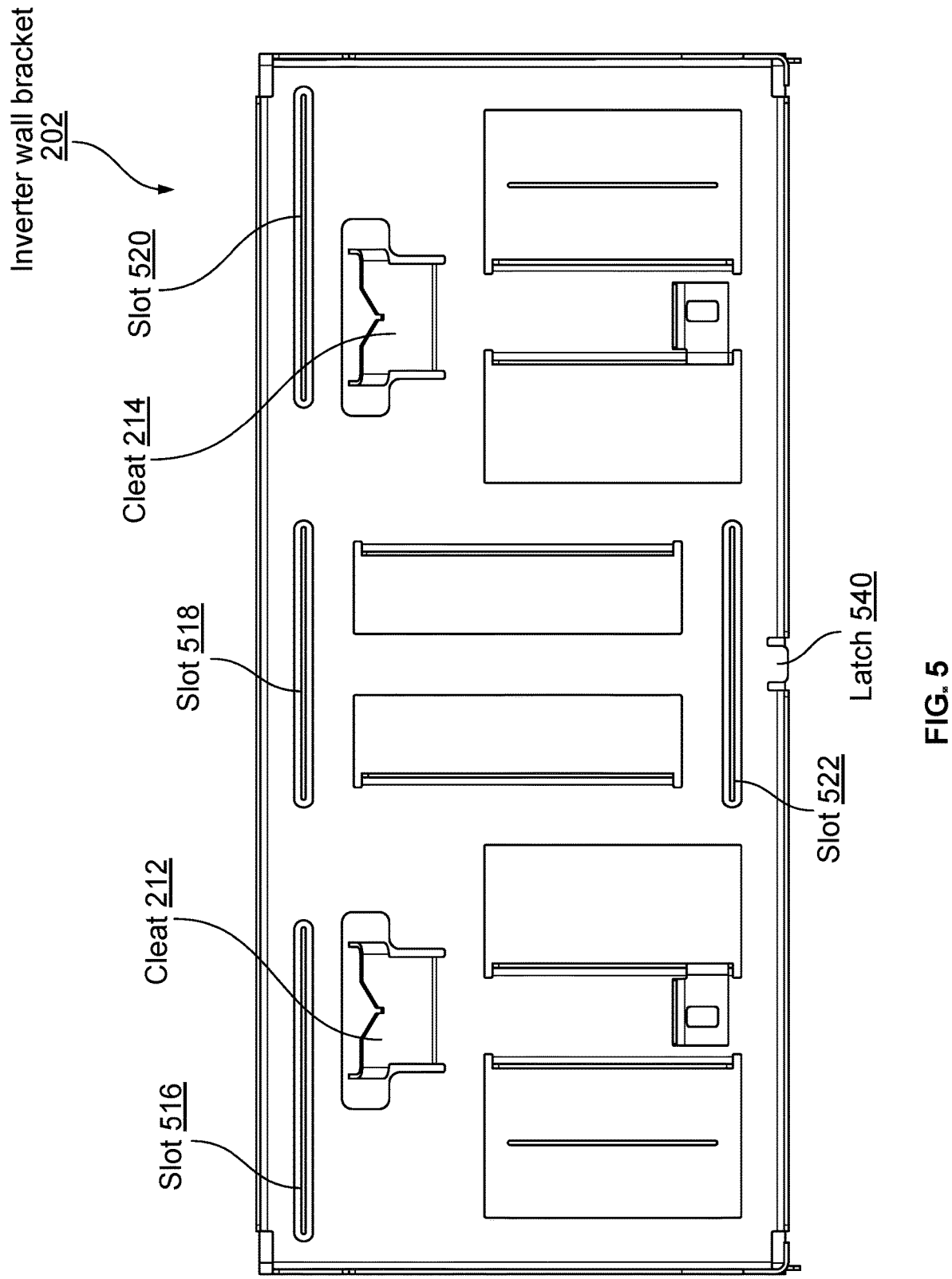
FIG. 5 is a front view of an inverter wall bracket according to an embodiment of the present disclosure.

FIG. 5 is a front view of an inverter wall bracket according to an embodiment of the present disclosure. The inverter wall bracket includes one or more slots 516, 518, 520, and 522; cleats 212 and 214; and latch 540. Each of the components are like their counterparts in FIG. 2 unless otherwise described.

The slots are adapted to receive screws, which allow the inverter wall bracket to be attached to the wall. Unlike the battery wall brackets, auxiliary brackets are not used for the inverter wall bracket 202. Instead, the inverter wall bracket is attached directly to the wall using one or more of the slots 516, 518, 520, and 522. Thus, the inverter wall bracket does not move relative to the wall, unlike the battery wall brackets, which are permitted to move relative to the wall as further described herein.

Also pictured (but not labeled) are examples of components for coupling an inverter to the inverter wall bracket 202. For example, three sets of flanges (two shorter ones on the left and right and a taller one in the center) guide corresponding components on an inverter to allow the inverter to be slid onto the inverter wall bracket.

Figure 6:
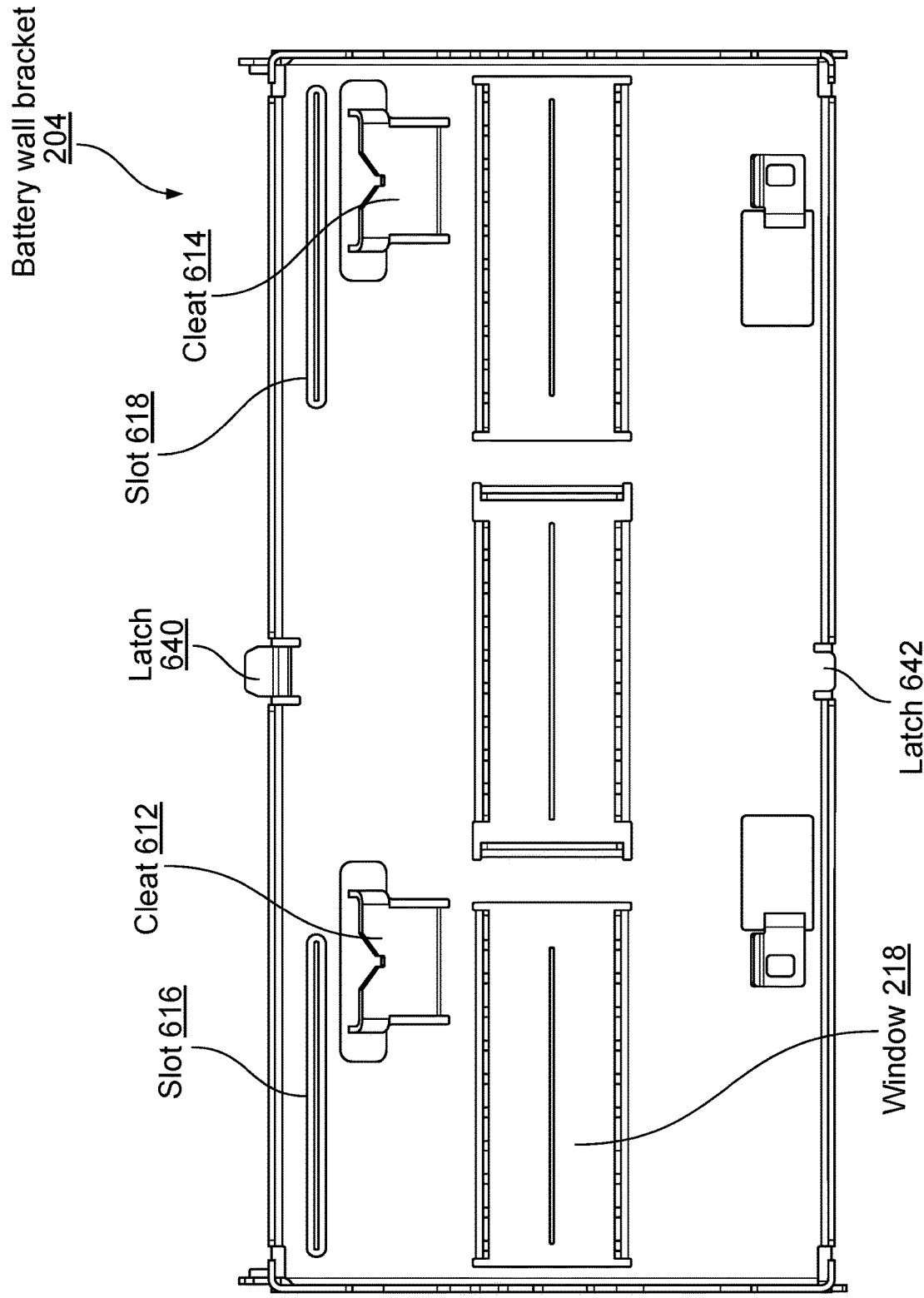
FIG. 6 is a front view of a battery wall bracket according to an embodiment of the present disclosure.

FIG. 6 is a front view of a battery wall bracket according to an embodiment of the present disclosure. The battery wall bracket 204 includes one or more slots 616 and 618; cleats 612 and 614; and latches 640 and 642. Each of the components are like their counterparts in FIG. 2 unless otherwise described. Latch 640 connects the battery wall bracket to a wall bracket above it (which may be an inverter wall bracket or another battery wall bracket) and latch 642 connects the battery wall bracket to a wall bracket below it. Two or more battery wall brackets may be coupled together such that the battery wall brackets translate together.

FIG. 7 shows coupled battery wall brackets according to an embodiment of the present disclosure. Each of the components are like their counterparts in FIGS. 1-4 unless otherwise described. The latch 720 is like the latch 220 joining an inverter wall bracket to a battery wall bracket. The joint 740 is like joint 410. In the event of ground settling, inverter portion 120 remains fixed to the wall, while the battery portion 110 shifts down. In other words, a gap at interface 342 widens due to the battery portion 110 shifting down.

FIG. 8A is a perspective view of an auxiliary bracket interfacing with a battery wall bracket according to an embodiment of the present disclosure. For context, a portion of a battery wall bracket 204 is shown. In this example, the battery wall bracket has a window 218 with an auxiliary bracket 802 fitted into the window. Referring briefly to the battery wall bracket 204 shown in FIG. 3, an auxiliary bracket may be provided on one or more of the three windows. The number and placement of auxiliary brackets is merely exemplary and not intended to be limiting. For example, if only a single stud is used, then a single auxiliary bracket through a center window is used, and if two studs are used, then two auxiliary brackets for a left and right window are used. In various embodiments, substantially all of the mechanical support of the battery portion is provided by the auxiliary brackets and from the feet that are touching the floor (further described with respect to FIGS. 9A and 9B).

Returning to FIG. 8A, the auxiliary bracket 802 and window 218 have a tooth and slot arrangement that provides clocking and position control. In various embodiments, the top and bottom of the window 218 have one or more teeth 808. In this example, the teeth run across the full length of the window, but it is also possible that teeth are provided in only a portion of the length of the window.

The teeth provide a range of motion so the battery wall bracket can be moved to a desired location, for example, relative to a stud. The auxiliary bracket can be attached to a wall (and consequently attaching the battery wall bracket to the wall) by driving a screw through the screw hole 806 into the wall (e.g., a stud in the wall). In various embodiments, a screw driven through the auxiliary bracket engages with a stud but does not need to be exactly centered.

For example, providing more teeth allows for more granularity or control of where to place the auxiliary brackets. As further described with respect to FIG. 8B, the auxiliary bracket 802 has four slots. A tooth fits into each slot, to allow the auxiliary bracket to be positioned in a desired location.

FIG. 8B is a perspective view of an auxiliary bracket according to an embodiment of the present disclosure. The auxiliary bracket 802 includes four slots, one of which is indicated as slot 804. In various embodiments, the auxiliary bracket provides retention to prevent the battery wall bracket (and the energy storage system) from tipping forward without preventing the battery wall bracket from sliding down relative to the wall. Therefore, as the ground settles, the battery wall bracket shifts up relative to the auxiliary bracket. The auxiliary bracket is fixed to the wall, and the battery wall bracket is permitted to move up and down (vertically translate) relative to the auxiliary bracket by an amount determined by the height 812 of the slots of the auxiliary bracket. In various embodiments, the slots are sized to be five millimeters tall (812 is five millimeters).

The sizing of the slot 804 (shorter in width and taller in height) allows a single degree of freedom (up-down) and restricts lateral motion. In the event of an earthquake, the slots do not permit lateral motion. This prevents any rotation or left-right translation.

The number of slots is merely exemplary and not intended to be limiting. For example, some auxiliary brackets may have fewer slots (e.g., two slots with one on top and one on the bottom), more slots (e.g., six slots with three on top and three on the bottom), or an odd number of slots. Four slots may be desirable because it provides sufficient flexibility by balancing range of motion and mechanical strength. Fewer slots provide more left to right strength this way, e.g., because the amount of material that is being loaded during a side-to-side earthquake is higher with the four slots. The symmetry of slots on the top and bottom allows the auxiliary bracket to be oriented either way, which may simplify installation.

Figure 9A:
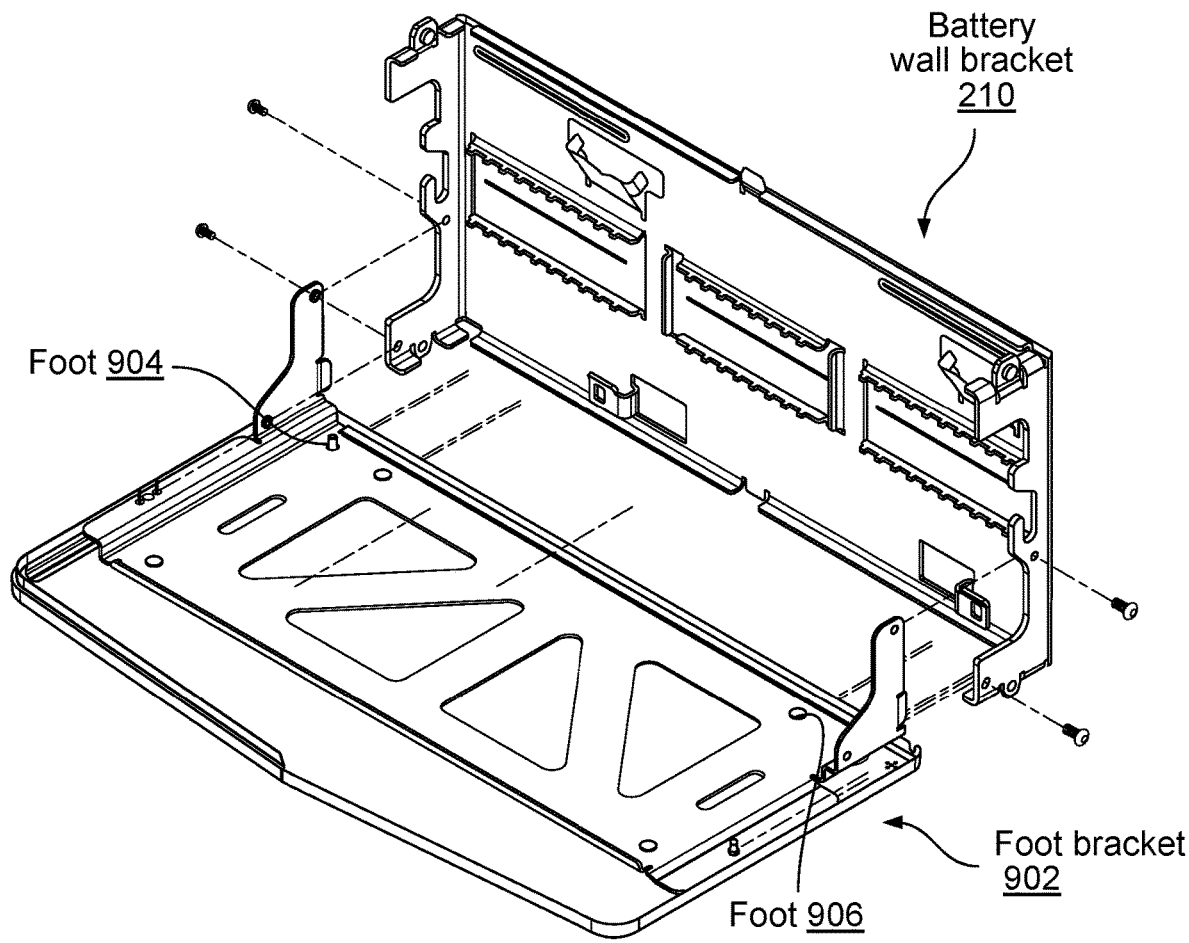
FIG. 9A is an exploded view of a foot bracket according to an embodiment of the present disclosure.
Figure 10:
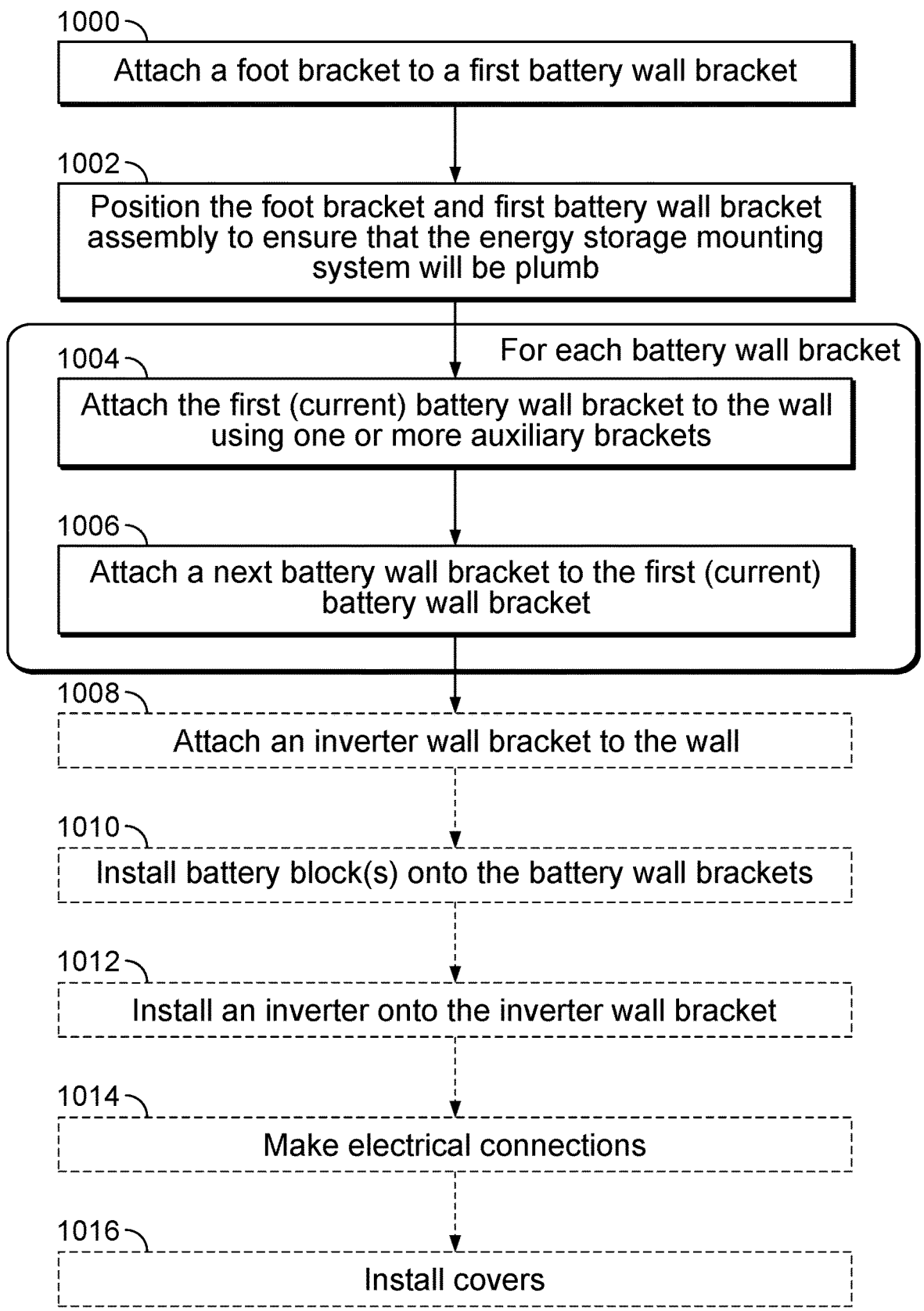
FIG. 10 is a flow diagram illustrating an embodiment of a process for installing an energy storage mounting system.

FIG. 9A is an exploded view of a foot bracket according to an embodiment of the present disclosure. For context, a battery wall bracket 210 is also shown. The foot bracket 902 can be coupled to the battery wall bracket by aligning the two brackets and securing them with one or more screws (here, two screws on each side). Feet 904 and 906 are adjustable, for example being able to extend into and out of the locations shown to level the energy storage mounting system. In some states, the feet are in contact with the ground.

Figure 9B:
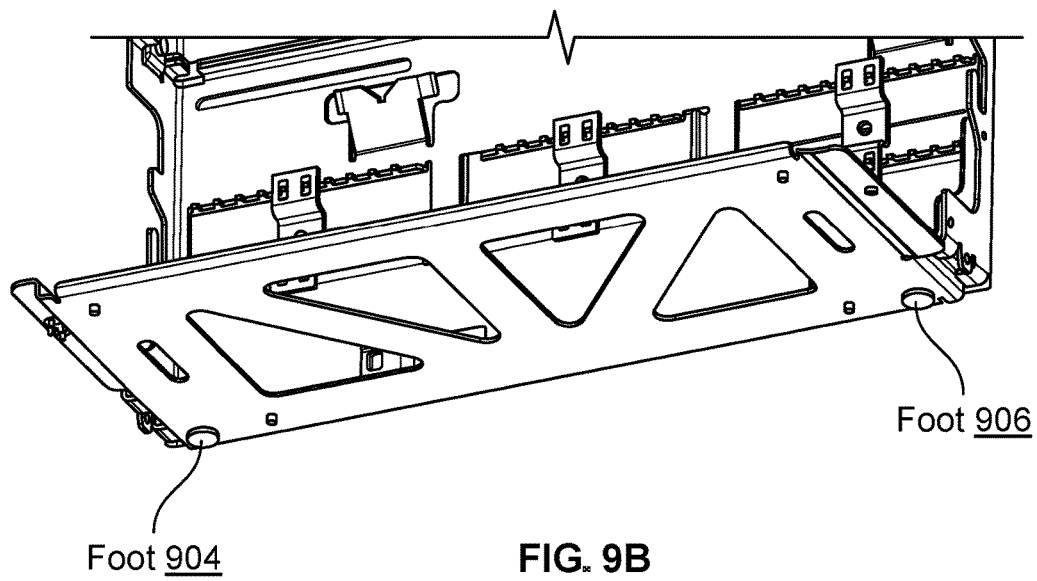
FIG. 9B is a perspective view of a foot according to an embodiment of the present disclosure.

FIG. 9B is a perspective view of a foot according to an embodiment of the present disclosure. In this view, the covers for the lowest battery wall bracket and foot bracket are shown. The feet 904 and 906 are adapted to be raised and lowered from an opening of the foot bracket cover as shown. The feet can be adjusted so the foot bracket and consequently the entire energy storage mounting system is level on the ground. In various embodiment, the feet are threaded adjustable feet.

The components may be made of any material that provides the function described herein. For example, steel, aluminum, or an alloy of several metals may be used. The choice of material may depend on desired strength or weight. The thicknesses of the components described herein may be varied depending on the selected material to provide the desired strength.

In various embodiments, one or more wall brackets (inverter wall bracket or battery wall bracket) may have skins, which are thin sheets with narrow slots corresponding to slots in the inverter wall bracket and/or the battery wall bracket. The skins may be provided on the back of the wall brackets, which is the side closest to the wall. The skins may prevent pest ingress into the energy storage system. Openings are blanked out by the skin to prevent pest ingress. In some installation cases (such as installing to a post or a stud that does not have a backing such as sheet rock), the screw that passes through the auxiliary bracket is expected to tear into a corresponding slot of the skin due to motion.

In some embodiments, the various components of the energy storage mounting system described herein are designed to reduce installation complexity and improve the ease of installation. The following figure shows an example of how the energy storage system is installed.

FIG. 10 is a flow diagram illustrating an embodiment of a process for installing an energy storage mounting system. The process will be explained using the reference numerals to indicate example components from FIGS. 1-9, but this is not intended to be limiting. The process can be performed by a technician to install an energy storage mounting system. The energy storage mounting system can be built as a monolith and then attached to the wall or can be built piece-wise on the wall. Piece-wise installation will be described, and similar principles can be applied to build the assembly first as a monolith and then mount the monolith to the wall.

A foot bracket is attached to a first battery wall bracket (1000). This assembly is referred to as the foot bracket (902) and battery wall bracket (210) assembly. The foot bracket and battery wall bracket assembly may be set down on the floor (or more generally, the surface intended to support the majority of the weight of the energy storage mounting system).

The foot bracket and battery wall bracket assembly is positioned to ensure that the energy storage mounting system will be plumb (1002). Adjustments may be made as needed to ensure that the system will be level. For example, one or more feet (904 and 906) of the foot bracket (902) are leveled.

The first battery wall bracket is attached to the wall using one or more auxiliary brackets (1004). In various embodiments, an auxiliary bracket is used to attach the battery wall bracket to various studs in the wall. If a single bracket is being used, then a middle auxiliary bracket is attached. Otherwise, two outer auxiliary brackets are attached. The auxiliary brackets align with the windows of the battery wall bracket, and a screw is driven through a hole 806 of the auxiliary bracket into a (stud on the) wall as described herein. This prevents the assembly from tipping forward. One, two, or more studs may be used depending on the weight of the assembly. The auxiliary bracket permits up and down movement, which allows the battery wall bracket to move in the event of ground settling without also dragging down an inverter wall bracket.

A next battery wall bracket is attached to the first battery wall bracket (1006). For example, a latch (220) can help align and at least partially secure two battery wall brackets to each other. A screw (402) can be installed to the left and another screw (404) to the right to secure the two battery wall brackets to each other. 1004 and 1006 can be repeated until all battery wall brackets have been installed.

An inverter wall bracket is attached to the wall (1008). In various embodiments, the inverter wall bracket 202 is positioned on the wall and screws are driven into wall studs via one or more slots 616 and 618. Similar to the battery wall bracket, one middle stud, two outer studs, or some other arrangement may be used. In various embodiments, one or more of the battery wall brackets and inverter wall bracket are self-locating, using locating features. Unlike the battery wall brackets, auxiliary brackets are not used for the inverter wall brackets because the inverter wall bracket is intended to remain substantially stationary on the wall, in various embodiments.

One or more battery blocks are installed onto the battery wall brackets (1010). After the wall brackets have been installed, battery packs (112-118) are placed in the battery wall brackets starting from the bottom and going up. In various embodiments, each battery wall bracket accommodates a respective battery block. A battery can be secured to a respective battery wall bracket via a hook and cleat arrangement. For example, hooks are matched on the sides. In various embodiments, there are two hooks and two cleats (612 and 614) per block. In various embodiments, a lifting tool is used to lift and place each battery block into a respective battery wall bracket.

An inverter is installed onto the inverter wall bracket (1012). The inverter is installed by matching one or more hooks and cleats (212 and 214) similar to the battery packs.

Electrical connections are made (1014). In various embodiments, the inverter is installed with a cover on, so the cover is removed from the inverter to make internal electrical connections. Example connections include running a conduit to conduit entry points (122 and 124) on the inverter and connecting internal terminal blocks to solar panels and home electrical systems. In various embodiments, a trunk harness is plugged in, e.g., by first plugging a corresponding connection of the harness into the inverter and then corresponding connections of the harness into each of the batteries. In various embodiments, a trunk harness has one connection to the inverter and one to each battery block. The trunk harness may have user guides (e.g., fir trees) that position the harness properly and prevent snagging when covers are installed. In various embodiments, the trunk harness has extra slack between the inverter portion 120 and the battery portion 110 to accommodate the expected motion due to ground settling.

Covers are installed (1016). For example, after electrical connections have been made, the inverter cover is replaced. In various embodiments, battery packs are shipped with covers off, so for each battery pack (e.g., from the bottom going up), battery covers are installed. In various embodiments, the orientation of battery covers is achieved through asymmetrical reveals that guide the installer to correctly orient the cover. The reveals also cover gaps between parts. In various embodiments, a door in the cover opens on the side that provides access to electrical connections. At the end or various points during the process, the feet may be re-adjusted as necessary to meet the ground.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An energy storage mounting system, comprising:
   an inverter wall bracket mounted to a wall, wherein an inverter is coupled to the inverter wall bracket; and
   a battery wall bracket to which a battery block is coupled, wherein:
      the battery wall bracket is coupled to the inverter wall bracket via a joint, the joint including an interface that opens in response to separation of the battery wall bracket from the inverter wall bracket due to movement of the battery wall bracket relative to the inverter wall bracket, wherein the inverter wall bracket remains fixed to the wall while the battery wall bracket moves;
      the battery wall bracket interfaces with an auxiliary bracket that is mounted to the wall;
      the battery wall bracket is vertically translatable relative to the auxiliary bracket;
      the battery block is at least in part ground-supported; and
      the battery block is electrically connected to the inverter.

2. The energy storage mounting system recited in claim 1, wherein the battery block is at least in part ground-supported via at least one adjustable foot.

3. The energy storage mounting system recited in claim 1, further comprising a foot bracket coupled to the battery wall bracket, wherein the battery block is at least in part ground-supported via the foot bracket.

4. The energy storage mounting system recited in claim 3, wherein the foot bracket comprises feet that are in contact with the ground.

5. The energy storage mounting system recited in claim 4, wherein the inverter wall bracket is fixed stationarily to the wall.

6. The energy storage mounting system recited in claim 5, wherein the inverter wall bracket is decoupled from the battery wall bracket.

7. The energy storage mounting system recited in claim 1, wherein the inverter is coupled to at least one conduit.

8. The energy storage mounting system recited in claim 1, further comprising a second battery wall bracket to which a second battery block is coupled.

9. The energy storage mounting system recited in claim 8, wherein the battery wall bracket and the second battery wall bracket are coupled together, such that the battery wall bracket and the second battery wall bracket translate together.

10. The energy storage mounting system recited in claim 1, wherein the battery wall bracket is vertically translatable relative to the auxiliary bracket in the range of 5 mm to 1 cm.

11. The energy storage mounting system recited in claim 1, wherein the battery wall bracket is vertically translatable relative to the auxiliary bracket by at least 1 cm.

12. The energy storage mounting system recited in claim 1, wherein the battery wall bracket is vertically translatable relative to the auxiliary bracket due to a sizing of a slot of the auxiliary bracket.

13. The energy storage mounting system recited in claim 12, wherein:
   the auxiliary bracket includes an inset portion;
   the auxiliary bracket includes a plurality of slots adapted to receive a tooth of the battery wall bracket;
   the plurality of slots is provided outside the inset portion; and
   a range of motion of the vertical translation is defined by a distance the tooth moves within a respective slot of the plurality of slots.

14. The energy storage mounting system recited in claim 1, wherein the auxiliary bracket includes a plurality of slots adapted to receive a tooth of the battery wall bracket.

15. The energy storage mounting system recited in claim 14, wherein at least one slot of the auxiliary bracket permits a single degree of freedom of movement.

16. The energy storage mounting system recited in claim 14, wherein at least one slot of the auxiliary bracket is between 5 mm and 1 cm tall.

17. The energy storage mounting system recited in claim 1, wherein at least one of the inverter wall bracket or the battery wall bracket is self-locating.

18. The energy storage mounting system recited in claim 1, further comprising a cover having a space between the inverter wall bracket and the battery wall bracket, the cover being adapted to move relative to the inverter wall bracket in response to vertical translation of the battery wall bracket.

19. The energy storage mounting system recited in claim 1, further comprising at least one skin having slots corresponding to slots in at least one of the inverter wall bracket or the battery wall bracket.

20. A method of installing an energy storage mounting system, comprising:
attaching a foot bracket to a first battery wall bracket;
positioning the foot bracket and the first battery wall bracket to ensure that the energy storage mounting system will be plumb;
attaching the first battery wall bracket to a wall using one or more auxiliary brackets including by;
aligning the auxiliary bracket with the first battery wall bracket including by aligning a first tooth of the battery wall bracket with a first slot of the auxiliary bracket and aligning a second tooth of the battery wall bracket with a second slot of the auxiliary bracket such that the battery wall bracket is vertically translatable relative to the auxiliary bracket in a range of motion defined by movement of the tooth within the slot; and
fixing the auxiliary bracket and the first battery wall bracket to the wall including by driving a screw to the wall via a screw hole positioned between the first slot of auxiliary bracket and the second slot of the auxiliary bracket and attaching a next battery wall bracket to the first battery wall bracket.

21. The method of claim 20, further comprising:
attaching an inverter wall bracket to the wall;
installing one or more battery blocks onto the first battery wall bracket;
installing an inverter onto the inverter wall bracket;
making electrical connections, wherein the electrical connections include a trunk harness having slack between the inverter wall bracket and the first battery wall bracket; and
installing covers.

22. The method of claim 20, wherein:
attaching the first battery wall bracket to a wall using one or more auxiliary brackets includes attaching an inset portion of the auxiliary bracket to a wall; and
the screw hole is provided in the inset portion of the auxiliary bracket.

\* \* \* \* \*